United States Patent
Tsaur et al.

(10) Patent No.: US 8,060,475 B1
(45) Date of Patent: Nov. 15, 2011

(54) INTELLIGENT RECOVERY POINT COPYING SYSTEM AND METHOD

(75) Inventors: Ynn-Pyng Tsaur, Oviedo, FL (US); Kirk L. Searls, Maitland, FL (US)

(73) Assignee: Symantec Corporation, Mountain View, CA (US)

( * ) Notice: Subject to any disclaimer, the term of this patent is extended or adjusted under 35 U.S.C. 154(b) by 447 days.

(21) Appl. No.: 12/328,117

(22) Filed: Dec. 4, 2008

(51) Int. Cl.
*G06F 7/00* (2006.01)
(52) U.S. Cl. ......... 707/641; 707/640; 707/645; 707/646
(58) Field of Classification Search .................. 707/640, 707/641, 645, 646
See application file for complete search history.

(56) References Cited

U.S. PATENT DOCUMENTS

| | | | | |
|---|---|---|---|---|
| 2006/0064444 | A1* | 3/2006 | van Ingen et al. | 707/204 |
| 2007/0094533 | A1* | 4/2007 | Coombs et al. | 714/6 |
| 2007/0220321 | A1* | 9/2007 | Iqbal et al. | 714/13 |
| 2009/0307286 | A1* | 12/2009 | Laffin | 707/204 |

OTHER PUBLICATIONS

"Backup", pp. 1-10 [online]. Retrieved on Nov. 18, 2008 from the Internet: <URL:http://en.wikipedia.org/wiki/Backup>. No author provided.
"Continuous data protection", pp. 1-2 [online]. Retrieved on Sep. 18, 2008 from the Internet: <URL:http://en.wikipedia.org/wiki/Continuous_data_protection>. No author provided.
"Disk image", pp. 1-3 [online]. Retrieved on Nov. 18, 2008 from the Internet: <URL:http://en.wikipedia.org/wiki/Disk_image>. No author provided.
"Incremental backup", pp. 1-3 [online]. Retrieved on Nov. 18, 2008 from the Internet: <URL:http://en.wikipedia.org/wiki/Incremental_backup>. No author provided.
"Veritas NetBackup™ -Platform", 2007, pp. 1-4, Symantec Corporation.
"Veritas NetBackup™ 6.0 Technical Overview", 2006, pp. 1-92, Symantec Corporation.

* cited by examiner

*Primary Examiner* — Etienne Leroux
*Assistant Examiner* — Cindy Nguyen
(74) *Attorney, Agent, or Firm* — Gunnison, McKay & Hodgson, L.L.P.; Philip McKay (57) ABSTRACT

A method of intelligently copying recovery points from a primary storage device to a secondary storage device is presented. The decision on how to copy the recovery points depends upon the backup copy policy as well as the availability of previous backups on the secondary storage device.

20 Claims, 6 Drawing Sheets

INTELLIGENT RECOVERY POINT COPYING SYSTEM AND METHOD

BACKGROUND

1. Field of the Invention

The present invention relates to computer system backup. More particularly, the present invention relates to a system and method of copying recovery points from one storage system to another.

2. Description of the Related Art

A backup refers to the making of copies of managed data so that the copies can be used to restore the managed data in the event that the managed data is lost. Typically, the managed data is stored in original storage, a primary copy of the managed data is stored in primary storage and a secondary copy of the managed data is stored in secondary storage. For example, the managed data is stored in a client system, the primary copy of the managed data is stored in a media server, and the secondary copy of the managed data is stored in a magnetic tape device.

The primary copy of the managed data stored in primary storage is organized to allow the managed data to be quickly and easily restored. For example, initially and then periodically, a full backup of all of the managed data is taken. After that, an incremental backup of only the managed data that has changed since the previous full or incremental backup is taken.

A recovery point is the state of the managed data at a particular point in time. Stated another way, the recovery point is the managed data existing at a particular point in time that is being protected. Typically, a recovery point is a full backup or a full backup plus incremental backup(s).

Many backup products copy every full and incremental backup from primary storage to secondary storage. As a result, the entire chain of incremental backups is copied.

As a result, in the event that a recovery point must be restored, there is slow restore performance due to the long chain of incremental backups that must be used.

Further, often only particular recovery points of all of the recovery points in primary storage are desired to be copied to secondary storage. Thus, copying the entire chain of incremental backups to secondary storage results in more recovery points being copied to secondary storage than are desired.

Further, if any ancestor full backup or ancestor incremental backup is missing, it may not be possible to restore the recovery point.

SUMMARY OF THE INVENTION

In accordance is one embodiment, a method of intelligently copying recovery points from a primary storage device to a secondary storage device is presented. The decision on how to copy the recovery points depends upon the backup copy policy as well as the availability of previous backups on the secondary storage device.

In various embodiments, a synthetic full backup and/or a consolidated incremental backup are generated on the primary storage device and copied to the secondary storage device. Thus, in the event a recovery point must be restored, restore performance is maximized as compared to restoring from a full backup and chain of incremental backups. Further, only the recovery point(s) specified by the backup copy policy are copied and copying of additional recovery points not specified by the backup copy policy is avoided. Further, every ancestor full and incremental backup for a recovery point is represented in the secondary storage device thus insuring that the recovery point can be restored, if necessary.

Embodiments are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 1:
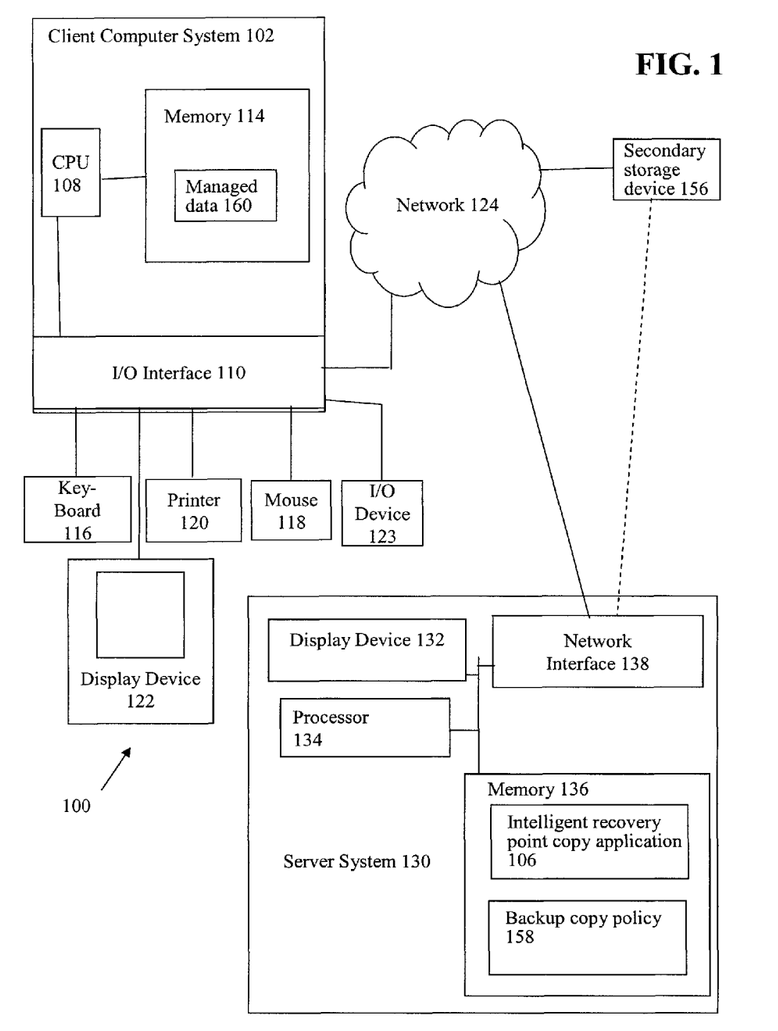
FIG. 1 is a diagram of a client-server system that includes an intelligent recovery point copy application executing on a server system in accordance with one embodiment.

FIG. 1 is a diagram of a client-server system 100 that includes an intelligent recovery point copy application 106 executing on a server system 130 in accordance with one embodiment. Client-server system 100 includes a client computer system 102, sometimes called an original storage device. Client computer system 102 typically includes a central processing unit (CPU) 108, hereinafter processor 108, an input output (I/O) interface 110, and a memory 114.

Client computer system 102 may further include standard devices like a keyboard 116, a mouse 118, a printer 120, and a display device 122, as well as, one or more standard input/output (I/O) devices 123, such as a compact disk (CD) or DVD drive, floppy disk drive, or other digital or waveform port for inputting data to and outputting data from client computer system 102.

Client computer system 102 is coupled to server system 130 of client-server system 100 by a network 124. Server system 130 is sometimes called a media server or primary storage device. Server system 130 typically includes a display device 132, a processor 134, a memory 136, and a network interface 138. Server system 130 may further include standard devices like a keyboard, a mouse, a printer, and an I/O device(s). In one embodiment, intelligent recovery point copy application 106 is loaded into server system 130 via an I/O device, such as from a CD, DVD or floppy disk containing intelligent recovery point copy application 106.

The various hardware components of server system 130 are not illustrated to avoid detracting from the principles of this embodiment.

Further, server system 130 is also coupled to a secondary storage device 156 by network 124. In one embodiment, secondary storage device 156 is similar to client computer system 102 and/or server system 130, for example, include a central processing unit, an input output (I/O) interface, and a memory.

Secondary storage device 156 may further include standard devices like a keyboard, a mouse, a printer, a display device and an I/O device(s). The various hardware components of secondary storage device 156 are not illustrated to avoid detracting from the principles of this embodiment.

In another embodiment, instead of being coupled by network 124, secondary storage device 156 is directly coupled to server system 130 as indicated by the dashed line. In this manner, data is provided directly from server system 130 to secondary storage device 156 and without passing through network 124.

Network 124 can be any network or network system that is of interest to a user. In various embodiments, network interface 138 and I/O interface 110 include analog modems, digital modems, or a network interface card.

Intelligent recovery point copy application 106 and a backup copy policy 158 are stored in memory 136 of server system 130 and executed on server system 130. The particular type of and configuration of client computer system 102, server system 130, and secondary storage device 156 are not essential to this embodiment.

In accordance with one embodiment, managed data 160, sometimes called original data, from memory 114 of client computer system 102 is backed up, i.e., copied, by intelligent recovery point copy application 106 to memory 136 of server system 130. In accordance with this embodiment, server system 130 is the primary storage device and memory 136 is the primary storage. For example, memory 136 includes one or more hard disk drives although other storage mediums, e.g., magnetic tapes, optical disks, floppy disks, solid-state storage, are used in other embodiments. Further, secondary storage device 156 is the secondary storage device and includes the secondary storage. For example, secondary storage device 156 includes one or more magnetic tape drives although other storage mediums, e.g., hard disks, optical disks, floppy disks, solid-state storage, are used in other embodiments.

A backup refers to the making of copies of managed data 160 so that the copies can be used to restore managed data 160 in the event of that managed data 160 is lost. A backup includes a file-by-file backup as well as an image backup of managed data 160 in accordance with various embodiments.

In accordance with one embodiment, backup copy policy 158, sometimes called a data lifecycle policy, defines the recovery points to be copied as well as the backup data format of the recovery points in server system 130. For example, backup copy policy 158 defines that a recovery point is to be copied periodically, e.g., hourly, daily, weekly, or monthly. Further, backup copy policy 158 defines how each recovery point is to be copied, as a full backup to server system 130 or as a full backup and incremental backups to server system 130.

A full backup is a copy of all of managed data 160. An incremental backup is a copy of managed data 160 that has changed since the previous full or incremental backup was taken. Although managed data 160 is illustrated and discussed as being in memory 114 of client computer system 102, in light of this disclosure, those of skill in the art will understand that managed data 160 may reside in one or more client computer systems, server systems including server system 130, other computer storage devices, and combinations thereof.

A recovery point is the state of managed data 160 at a particular point in time. Stated another way, the recovery point is managed data 160 existing at a particular point in time. In accordance with one embodiment, a recovery point in server system 130 is a full backup or a full backup plus incremental backup(s).

In accordance with this embodiment, backup copy policy 158 also defines which recovery points stored in server system 130 are copied to secondary storage device 156. As discussed in greater detail below with reference to FIG. 2, these recovery points as specified in backup copy policy 158 are intelligently copied to secondary storage device 156.

Figure 2:
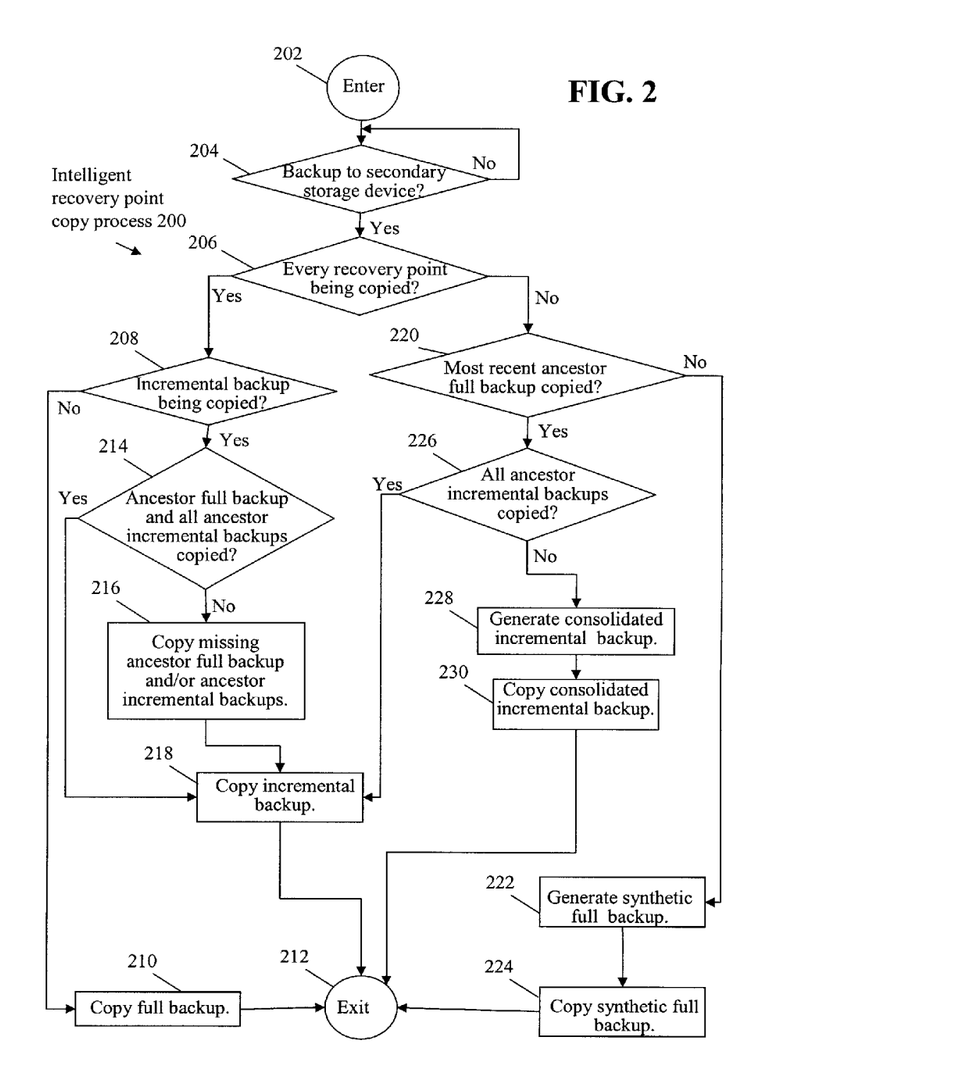
FIG. 2 is a flow diagram of an intelligent recovery point copy process in accordance with one embodiment.

FIG. 2 is a flow diagram of an intelligent recovery point copy process 200 in accordance with one embodiment. Referring now to FIGS. 1 and 2 together, execution of intelligent recovery point copy application 106 by processor 134 results in the operations of intelligent recovery point copy process 200 as described below in one embodiment.

From an ENTER OPERATION 202, flow moves to a BACKUP TO SECONDARY STORAGE DEVICE CHECK OPERATION 204. In BACKUP TO SECONDARY STORAGE DEVICE CHECK OPERATION 204, a determination is made as to whether there is a backup, i.e., copying of recovery points from server system 130 to secondary storage device 156. If there is not a backup to secondary storage device 156, flow remains at BACKUP TO SECONDARY STORAGE DEVICE CHECK OPERATION 204. Conversely, if there is a backup to secondary storage device 156, flow moves from BACKUP TO SECONDARY STORAGE DEVICE CHECK OPERATION 204 to an EVERY RECOVERY POINT BEING COPIED CHECK OPERATION 206.

For example, a user and/or administrator of server system 130 runs a manual backup to copy a recovery point from server system 130 to secondary storage device 156. In another example, a scheduled automatic backup to copy a recovery point from server system 130 to secondary storage device 156 is run.

For a further example, backup copy policy 158 defines that a full backup of managed data 160 on client computer system 102 to server system 130 is performed monthly. Further, backup copy policy 158 defines that an incremental backup of managed data 160 on client computer system 102 to server system 130 is performed daily. Accordingly, backup copy policy 158 defines that a recovery point is copied to server system 130 daily. The recovery point is either a full backup or a full backup plus incremental backup(s).

In addition, backup copy policy 158 specifies which recovery points from server system 130 are to be copied to secondary storage device 156. As copying of a recovery point from server system 130 to secondary storage device 156 is initiated, a determination is made that there is a backup to secondary storage device 156, and flow moves to EVERY RECOVERY POINT BEING COPIED CHECK OPERATION 206.

In EVERY RECOVERY POINT BEING COPIED CHECK OPERATION 206, a determination is made as to whether every recovery point in server system 130 is to be copied to secondary storage device 156. If a determination is made that every recovery point is to be copied to secondary storage device 156, flow moves from EVERY RECOVERY POINT BEING COPIED CHECK OPERATION 206 to an INCREMENTAL BACKUP BEING COPIED CHECK OPERATION 208.

In INCREMENTAL BACKUP BEING COPIED CHECK OPERATION 208, a determination is made as to whether an incremental backup is being copied to secondary storage device 156. More particularly, a determination is made as to whether the most recent backup copy, sometimes called the target backup copy, in server system 130 is a full backup or an incremental backup. In one embodiment, the backup copies in server system 130, e.g., full and incremental backups, include timestamps of when the backup was performed. If the most recent backup copy is a full backup, a determination is made that a full backup is being copied, i.e., not an incremental backup, and flow moves from INCREMENTAL BACKUP BEING COPIED CHECK OPERATION 208 to a COPY FULL BACKUP OPERATION 210.

In COPY FULL BACKUP OPERATION 210, the most recent full backup on server system 130 is copied to secondary storage device 156. From COPY FULL BACKUP OPERATION 210, flow moves to and exits at an EXIT OPERATION 212 or returns to BACKUP TO SECONDARY STORAGE DEVICE CHECK OPERATION 204 and awaits the next backup to secondary storage device 156.

Conversely, returning again to INCREMENTAL BACKUP BEING COPIED CHECK OPERATION 208, upon a determination that the most recent backup copy in server system 130 is an incremental backup, a determination is made that an incremental backup is being copied. Accordingly, flow moves from INCREMENTAL BACKUP BEING COPIED CHECK OPERATION 208 to an ANCESTOR FULL BACKUP AND ALL ANCESTOR INCREMENTAL BACKUPS COPIED CHECK OPERATION 214.

In ANCESTOR FULL BACKUP AND ALL ANCESTOR INCREMENTAL BACKUPS COPIED CHECK OPERATION 214, a determination is made as to whether the ancestor full backup and all ancestor incremental backups have previously been copied to secondary storage device 156. Stated another way, in ANCESTOR FULL BACKUP AND ALL ANCESTOR INCREMENTAL BACKUPS COPIED CHECK OPERATION 214, a determination is made as to whether the ancestor full backup and all ancestor incremental backups are present in secondary storage device 156.

If the ancestor full backup and all ancestor incremental backups have not been copied to secondary storage device 156, flow moves from ANCESTOR FULL BACKUP AND ALL ANCESTOR INCREMENTAL BACKUPS COPIED CHECK OPERATION 214 to a COPY MISSING ANCESTOR FULL BACKUP AND/OR ANCESTOR INCREMENTAL BACKUPS OPERATION 216. Conversely, if the ancestor full backup and all ancestor incremental backups have been copied to secondary storage device 156, flow moves from ANCESTOR FULL BACKUP AND ALL ANCESTOR INCREMENTAL BACKUPS COPIED CHECK OPERATION 214 to a COPY INCREMENTAL BACKUP OPERATION 218.

Accordingly, if the ancestor full backup and all ancestor incremental backups have not been copied to secondary storage device 156, flow moves from ANCESTOR FULL BACKUP AND ALL ANCESTOR INCREMENTAL BACKUPS COPIED CHECK OPERATION 214 to COPY MISSING ANCESTOR FULL BACKUP AND/OR ANCESTOR INCREMENTAL BACKUPS OPERATION 216. In COPY MISSING ANCESTOR FULL BACKUP AND/OR ANCESTOR INCREMENTAL BACKUPS OPERATION 216, any missing ancestor full backup and/or any missing ancestor incremental backups are copied from server system 130 to secondary storage device 156.

In one embodiment, an ancestor full backup is the most recent full backup on server system 130. Ancestor incremental backups are all incremental backups on server system 130 that have occurred between the ancestor full backup and the most recent incremental backup on server system 130 that is being copied.

From ANCESTOR FULL BACKUP AND ALL ANCESTOR INCREMENTAL BACKUPS COPIED CHECK OPERATION 214 or from COPY MISSING ANCESTOR FULL BACKUP AND/OR ANCESTOR INCREMENTAL BACKUPS OPERATION 216, flow moves to COPY INCREMENTAL BACKUP OPERATION 218. In COPY INCREMENTAL BACKUP OPERATION 218, the most recent incremental backup on server system 130 is copied to secondary storage device 156.

As a result, each recovery point in server system 130 is copied to secondary storage device 156. Further, every ancestor full and incremental backup is copied to secondary storage device 156 thus insuring that the recovery point can be restored, if necessary.

From COPY INCREMENTAL BACKUP OPERATION 218, flow moves to and exits at EXIT OPERATION 212 or returns to BACKUP TO SECONDARY STORAGE DEVICE CHECK OPERATION 204 and awaits the next backup to secondary storage device 156.

Returning again to EVERY RECOVERY POINT BEING COPIED CHECK OPERATION 206, upon a determination that not every recovery point from server system 130 is being copied to secondary storage device 156, flow moves from EVERY RECOVERY POINT BEING COPIED CHECK OPERATION 206 to a MOST RECENT ANCESTOR FULL BACKUP COPIED CHECK OPERATION 220.

For example, backup copy policy 158 specifies which recovery points from server system 130 are to be copied to secondary storage device 156. To illustrate, backup copy policy 158 specifies that a daily recovery point is to be copied to server system 130. However, backup copy policy 158 specifies that only a weekly recovery point is to be copied from server system 130 to secondary storage device 156. Accordingly, a recovery point is copied to server system 130 each day, and only the recovery point copied to server system 130 at the end of the week is copied to secondary storage device 156.

In MOST RECENT ANCESTOR FULL BACKUP COPIED CHECK OPERATION 220, a determination is made as to whether the most recent ancestor full backup has been copied to secondary storage device 156.

In one embodiment, if a synthetic full backup created by combining the most recent ancestor full backup with incremental backups has been copied, then the most recent ancestor full backup has been effectively copied, although not exactly. Accordingly, if a synthetic full backup created by combining the most recent ancestor full backup with incremental backups has been copied, a determination is made that the most recent ancestor full backup has been copied to secondary storage device 156. Thus, a full backup includes a standard full backup of managed data 160 as well as a synthetic full backup.

If the most recent ancestor full backup has not been copied to secondary storage device 156, flow moves from MOST RECENT ANCESTOR FULL BACKUP COPIED CHECK OPERATION 220 to a GENERATE SYNTHETIC FULL BACKUP OPERATION 222.

In GENERATE SYNTHETIC FULL BACKUP OPERATION 222, a synthetic full backup is generated on server system 130. The synthetic full backup is created from the most recent ancestor full backup and all incremental backups after the ancestor full backup including the most recent incremental backup. As those of skill in the art will understand in light of this disclosure, a synthetic full backup combines the most recent ancestor full backup and all incremental backups after the ancestor full backup into a single synthetic full backup that represents the most recent recovery point being copied.

From GENERATE SYNTHETIC FULL BACKUP OPERATION 222, flow moves to a COPY SYNTHETIC FULL BACKUP OPERATION 224. In COPY SYNTHETIC FULL BACKUP OPERATION 224, the synthetic full backup generated in GENERATE SYNTHETIC FULL BACKUP OPERATION 222 is copied from server system 130 to secondary storage device 156. From COPY SYNTHETIC FULL BACKUP OPERATION 224, flow moves to and exits at EXIT OPERATION 212 or returns to BACKUP TO SECONDARY STORAGE DEVICE CHECK OPERATION 204 and awaits the next backup to secondary storage.

Accordingly, the synthetic full backup is copied instead of a full backup and chain of incremental backups. Thus, in the event the recovery point must be restored, restore performance is maximized as compared to restoring from a full backup and chain of incremental backups. Further, only the recovery point specified by backup copy policy 158 is copied and copying of additional recovery points not specified by backup copy policy 158 is avoided. Further, the synthetic full backup represents every ancestor full and incremental backup thus insuring that the recovery point can be restored, if necessary.

Returning again to MOST RECENT ANCESTOR FULL BACKUP COPIED CHECK OPERATION 220, upon a determination that the most recent ancestor full backup has been copied to secondary storage device 156, flow moves from MOST RECENT ANCESTOR FULL BACKUP COPIED CHECK OPERATION 220 to an ALL ANCESTOR INCREMENTAL BACKUPS COPIED CHECK OPERATION 226.

In ALL ANCESTOR INCREMENTAL BACKUPS COPIED CHECK OPERATION 226, a determination is made as to whether all ancestor incremental backups have been copied to secondary storage device 156. In one embodiment, if a synthetic full backup created by combining a full backup and all the ancestor incremental backups or a consolidated incremental backup created by combining all the ancestor incremental backups has been copied, then all the ancestor incremental backups have been effectively copied, although not exactly. Accordingly, if a synthetic full backup created by combining a full backup and all the ancestor incremental backups or a consolidated incremental backup created by combining all the ancestor incremental backups has been copied, a determination is made that all the ancestor incremental backups have been copied to secondary storage device 156.

If all ancestor incremental backups have been copied to secondary storage device 156, flow moves from ALL ANCESTOR INCREMENTAL BACKUPS COPIED CHECK OPERATION 226 to COPY INCREMENTAL BACKUP OPERATION 218, which is performed as discussed above. Conversely, if all ancestor incremental backups have not been copied to secondary storage device 156, flow moves from ALL ANCESTOR INCREMENTAL BACKUPS COPIED CHECK OPERATION 226 to a GENERATE CONSOLIDATED INCREMENTAL BACKUP OPERATION 228.

In GENERATE CONSOLIDATED INCREMENTAL BACKUP OPERATION 228, a consolidated incremental backup is generated on server system 130. The consolidated incremental backup is created from all ancestor incremental backups that have not been copied to secondary storage device 156. As those of skill in the art will understand in light of this disclosure, a consolidated incremental backup combines all ancestor incremental backups that have not been copied to secondary storage device 156 into a single consolidated incremental backup that represents the changes to managed data 160 from the most recent recovery point copied to secondary storage device 156. More particularly, the consolidated incremental backup represents the changes to managed data 160 from the previous recovery point copied to secondary storage device 156 to the recovery point currently being copied to secondary storage device 156.

From GENERATE CONSOLIDATED INCREMENTAL BACKUP OPERATION 228, flow moves to a COPY CONSOLIDATED INCREMENTAL BACKUP OPERATION 230. In COPY CONSOLIDATED INCREMENTAL BACKUP OPERATION 230, the consolidated incremental backup generated in GENERATE CONSOLIDATED INCREMENTAL BACKUP OPERATION 228 is copied from server system 130 to secondary storage device 156. From COPY CONSOLIDATED INCREMENTAL BACKUP OPERATION 230, flow moves to and exits at EXIT OPERATION 212 or returns to BACKUP TO SECONDARY STORAGE DEVICE CHECK OPERATION 204 and awaits the next backup to secondary storage.

Accordingly, the synthetic incremental backup is copied instead of a chain of incremental backups. Thus, in the event the recovery point must be restored, restore performance is maximized as compared to restoring from a full backup and chain of incremental backups. Further, only the recovery point specified by backup copy policy 158 is copied and copying of additional recovery points not specified by backup copy policy 158 is avoided. Further, the synthetic incremental backup represents every un-copied ancestor incremental backup thus insuring that the recovery point can be restored, if necessary.

Figure 3:
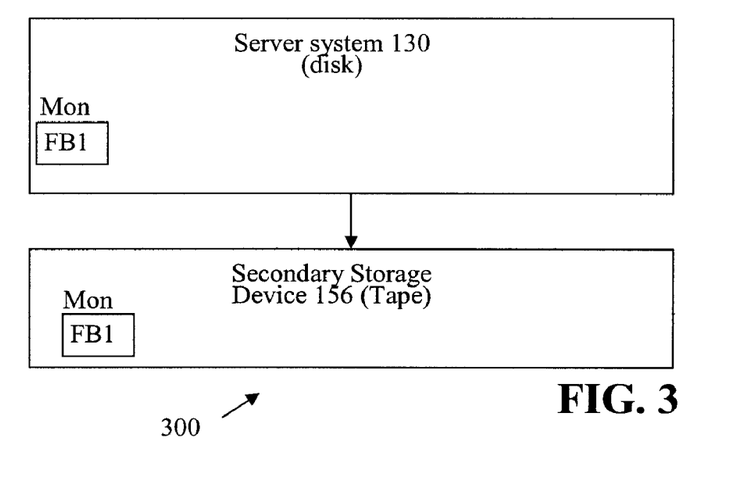
FIG. 3 is a block diagram illustrating intelligently copying recovery points to a secondary storage device in accordance with one embodiment.

FIG. 3 is a block diagram 300 illustrating intelligently copying recovery points to secondary storage device 156 in accordance with one embodiment. Referring now to FIGS. 1, 2 and 3 together, in accordance with this example, backup copy policy 158 specifies that a full backup to server system 130 is performed on a monthly basis and incremental backups to server system 130 are performed daily. Further, backup copy policy 158 specifies that every recovery point is copied from server system 130 to secondary storage device 156 weekly, and more particularly on Sunday.

In accordance with this illustration, on Monday, a full backup FB1 of managed data 160 is copied to server system 130 as illustrated. Upon initiation of the backup to secondary storage device 156, a determination is made that there is a backup to secondary storage device 156 and flow moves from BACKUP TO SECONDARY STORAGE DEVICE CHECK OPERATION 204 to EVERY RECOVERY POINT BEING COPIED CHECK OPERATION 206. As set forth above, backup copy policy 158 specifies that every recovery point is to be copied to secondary storage device 156 and so flow moves to INCREMENTAL BACKUP BEING COPIED CHECK OPERATION 208.

In this case, full backup FB1, i.e., a full backup and not an incremental backup, is being copied to secondary storage device 156. Accordingly, a determination is made that an incremental backup is not being copied, and flow moves to COPY FULL BACKUP OPERATION 210.

In COPY FULL BACKUP OPERATION 210, full backup FB1 is copied to secondary storage device 156 as illustrated in FIG. 3.

Figure 4:
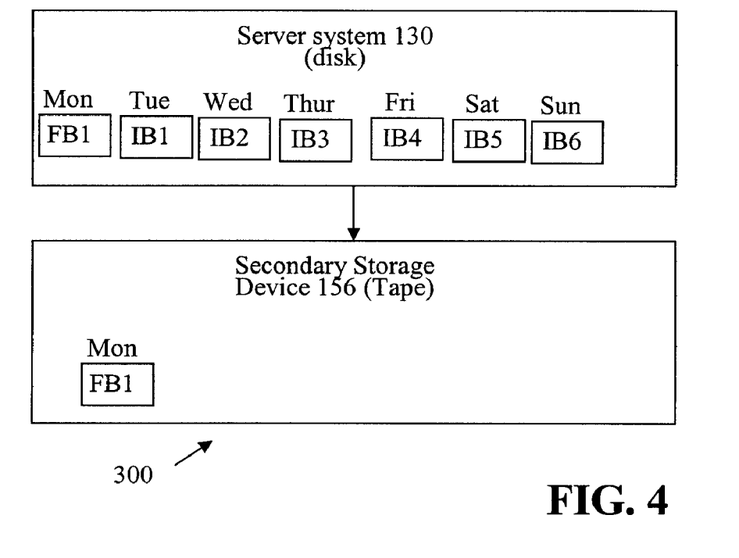
FIGS. 4 and 5 are the block diagram of FIG. 3 at later stages of intelligently copying recovery points to the secondary storage device in accordance with one embodiment.

FIG. 4 is block diagram 300 of FIG. 3 at a later stage of intelligently copying recovery points to secondary storage device 156 in accordance with one embodiment. Referring now to FIGS. 1, 2 and 4 together, as set forth above, backup copy policy 158 specifies that incremental backups are copied to server system 130 daily. Accordingly, at the end of the first week, full backup FB1, and incremental backups IB1, IB2, IB3, IB3, IB5, IB6 exist within server system 130. As illustrated in FIG. 4, only full backup FB1 exists within secondary storage device 156.

Figure 5:
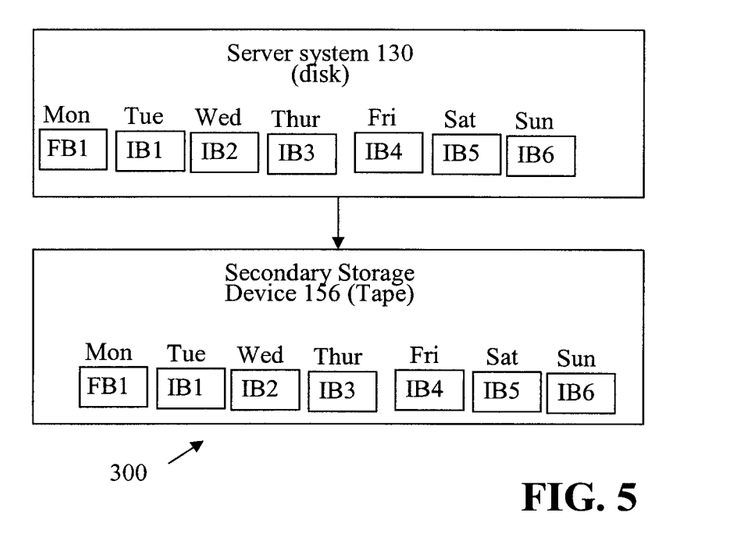

FIG. 5 is block diagram 300 of FIG. 4 at a later stage of intelligently copying recovery points to secondary storage device 156 in accordance with one embodiment. Referring now to FIGS. 1, 2, 4, and 5 together, as discussed above, backup copy policy 158 specifies that every recovery point is copied from server system 130 to secondary storage device 156 weekly, and more particularly on Sunday. Accordingly, on Sunday, the scheduled automatic backup of every recovery point from server system 130 to secondary storage device 156 is initiated.

Upon initiation of the automatic backup, a determination is made that there is a backup to secondary storage device 156 and flow moves from BACKUP TO SECONDARY STORAGE DEVICE CHECK OPERATION 204 to EVERY RECOVERY POINT BEING COPIED CHECK OPERATION 206. As set forth above, backup copy policy 158 specifies that every recovery point is to be copied to secondary storage device 156 and so flow moves to INCREMENTAL BACKUP BEING COPIED CHECK OPERATION 208.

In this case, the most recent backup in server system 130 is incremental backup IB6, i.e., the target backup. Accordingly, incremental backup IB6, i.e., an incremental backup, is being copied to secondary storage device 156. Thus, a determination is made that an incremental backup is being copied, and flow moves to ANCESTOR FULL BACKUP AND ALL ANCESTOR INCREMENTAL BACKUPS COPIED CHECK OPERATION 214.

In this example, only full backup FB1 has been copied to secondary storage device 156 as illustrated in FIG. 4. Accordingly, incremental backups IB1-IB5 on server system 130 as illustrated in FIG. 4, i.e., the ancestor incremental backups to incremental backup IB6, have not been copied to secondary storage device 156. Thus, flow moves from ANCESTOR FULL BACKUP AND ALL ANCESTOR INCREMENTAL BACKUPS COPIED CHECK OPERATION 214 to COPY MISSING ANCESTOR FULL BACKUP AND/OR ANCESTOR INCREMENTAL BACKUPS OPERATION 216. In COPY MISSING ANCESTOR FULL BACKUP AND/OR ANCESTOR INCREMENTAL BACKUPS OPERATION 216, the missing ancestor incremental backups IB1-IB5 are copied from server system 130 to secondary storage device 156 as illustrated in FIG. 5 and flow moves to COPY INCREMENTAL BACKUP OPERATION 218.

In COPY INCREMENTAL BACKUP OPERATION 218, incremental backup IB6 is copied from server system 130 to secondary storage device as illustrated in FIG. 5.

Figure 6:
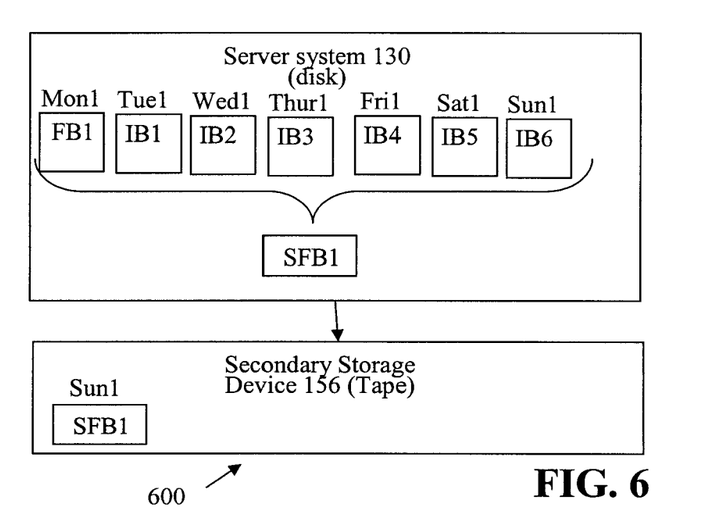
FIG. 6 is a block diagram illustrating intelligently copying recovery points to a secondary storage device in accordance with another embodiment.

FIG. 6 is a block diagram 600 illustrating intelligently copying recovery points to secondary storage device 156 in accordance with another embodiment. Referring now to FIGS. 1, 2 and 6 together, in accordance with this example, backup copy policy 158 specifies that a full backup to server system 130 is performed on a monthly basis and incremental backups to server system 130 are performed daily. Further, backup copy policy 158 specifies that a weekly recovery point is copied from server system 130 to secondary storage device 156, and more particularly, a recovery point is copied on Sunday.

In accordance with this illustration, on the first Monday, a full backup FB1 of the managed data is copied to server system 130 as illustrated. From the first Tuesday through Sunday, incremental backups IB1, IB2, IB3, IB4, IB5, IB6 are copied to server system 130 as illustrated.

Backup copy policy 158 specifies that a weekly recovery point is copied from server system 130 to secondary storage device 156, and more particularly, a recovery point is copied on Sunday. Accordingly, on the first Sunday, the scheduled automatic backup of the weekly recovery point from server system 130 to secondary storage device 156 is initiated.

Upon initiation of the automatic backup, a determination is made that there is a backup to secondary storage device 156 and flow moves from BACKUP TO SECONDARY STORAGE DEVICE CHECK OPERATION 204 to EVERY RECOVERY POINT BEING COPIED CHECK OPERATION 206. As set forth above, backup copy policy 158 specifies that only a weekly recovery point is copied. More particularly, backup copy policy 158 specifies that only one recovery point (on Sunday) is copied to secondary storage device 156 for every seven recovery points (Monday through Sunday) that are copied to server system 130.

Accordingly, flow moves to MOST RECENT ANCESTOR FULL BACKUP COPIED CHECK OPERATION 220. At this point in time, nothing has been copied to secondary storage device 156. Accordingly, a determination is made that the most recent ancestor full backup has not been copied, and flow moves to GENERATE SYNTHETIC FULL BACKUP OPERATION 222.

In GENERATE SYNTHETIC FULL BACKUP OPERATION 222, a synthetic full backup SFB1 is generated on server system 130 as illustrated in FIG. 6. More particularly, full backup FB1 and incremental backups IB1-IB6 are combined to create synthetic full backup SFB1 that represents the first Sunday recovery point.

After synthetic full backup SFB1 is generated on server system 130, flow moves to COPY SYNTHETIC FULL BACKUP OPERATION 224. Synthetic full backup SFB1 is copied from server system 130 to secondary storage device 156 as illustrated in FIG. 6.

Figure 7:
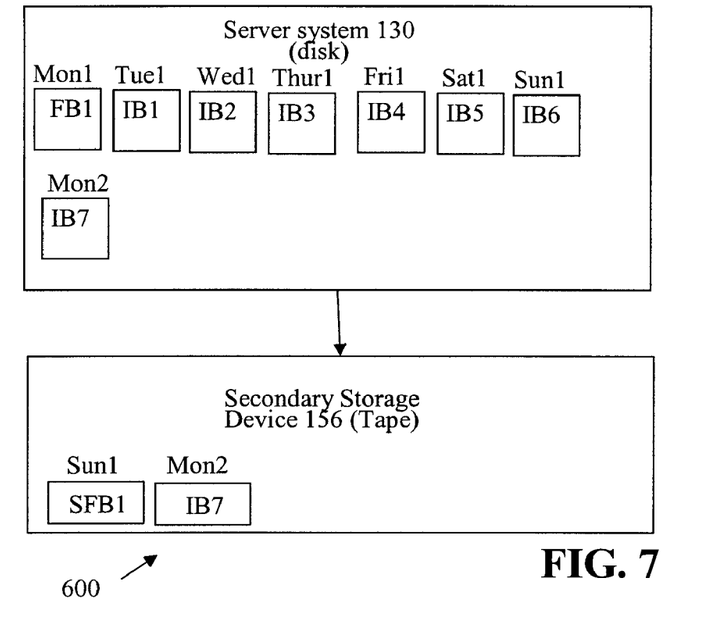
FIGS. 7, 8, and 9 are the block diagram of FIG. 6 at later stages of intelligently copying recovery points to the secondary storage device in accordance with one embodiment.

FIG. 7 is block diagram 600 of FIG. 6 at a later stage of intelligently copying recovery points to secondary storage device 156 in accordance with one embodiment. In accordance with this illustration, on the second Monday, in accordance with backup copy policy 158, an incremental backup IB7 is copied to server system 130. Further, in accordance with this example, the user runs a manual backup to copy the second Monday's recovery point to secondary storage device 156.

Accordingly, upon initiation of the manual backup, a determination is made that there is a backup to secondary storage device 156 and flow moves from BACKUP TO SECONDARY STORAGE DEVICE CHECK OPERATION 204 to EVERY RECOVERY POINT BEING COPIED CHECK OPERATION 206. As set forth above, backup copy policy 158 specifies that only a weekly recovery point is copied to secondary storage device 156. Accordingly, flow moves to MOST RECENT ANCESTOR FULL BACKUP COPIED CHECK OPERATION 220.

As set forth above, synthetic full backup SFB1 was created by combining full backup FB1 with incremental backups IB1-IB6. Accordingly, full backup FB1, i.e., the most recent ancestor fully backup, has been copied to secondary storage device 156 and flow moves to ALL ANCESTOR INCREMENTAL BACKUPS COPIED CHECK OPERATION 226.

Incremental backups IB1-IB6, i.e., all ancestor incremental backups, have been copied to secondary storage device 156 as part of synthetic full backup SFB1. Accordingly, flow moves to COPY INCREMENTAL BACKUP OPERATION 218. In COPY INCREMENTAL BACKUP OPERATION 218, incremental backup IB7 is copied to secondary storage 156 as illustrated in FIG. 7.

Figure 8:
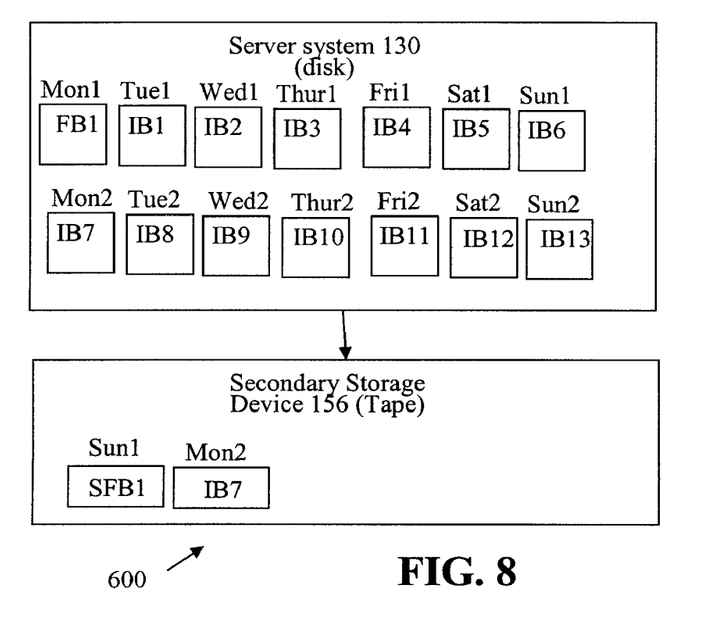

FIG. 8 is block diagram 600 of FIG. 7 at a later stage of intelligently copying recovery points to secondary storage device 156 in accordance with one embodiment. Referring now to FIGS. 1, 2, 7 and 8 together, as set forth above, backup copy policy 158 specifies that incremental backups are copied to server system 130 daily. Accordingly, at the end of the second week, full backup FB1, and incremental backups IB1, IB2, IB3, IB4, IB5, IB6, IB7, IB8, IB9, IB10, IB11, IB12, IB13 exist within server system 130. As illustrated in FIG. 8, only synthetic full backup SFB1 and incremental backup IB7 exist within secondary storage device 156.

Figure 9:
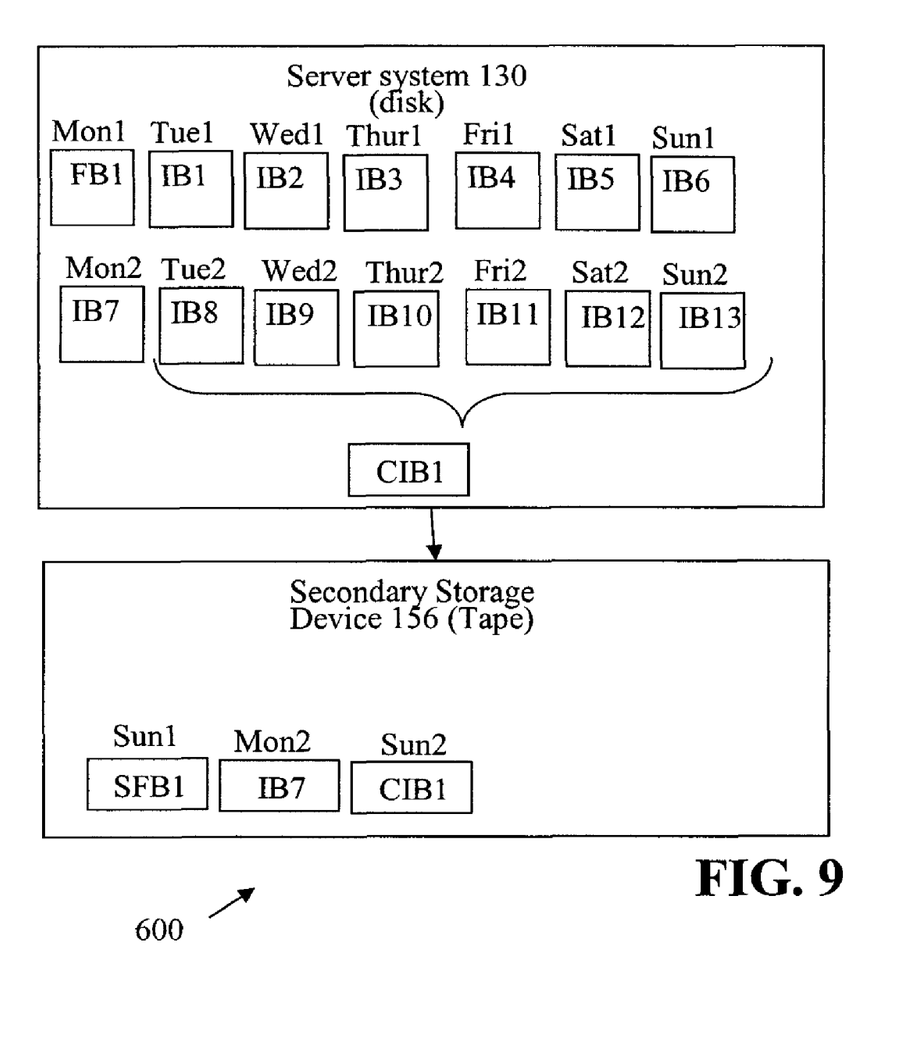

FIG. 9 is block diagram 600 of FIG. 8 at a later stage of intelligently copying recovery points to secondary storage device 156 in accordance with one embodiment. Referring now to FIGS. 1, 2, 8, and 9 together, as discussed above, backup copy policy 158 specifies that a weekly recovery point is copied from server system 130 to secondary storage device 156, and more particularly, a recovery point is copied on Sunday. Accordingly, on the second Sunday, the scheduled automatic backup of the weekly recovery point from server system 130 to secondary storage device 156 is initiated.

Upon initiation of the automatic backup, a determination is made that there is a backup to secondary storage device 156 and flow moves from BACKUP TO SECONDARY STORAGE DEVICE CHECK OPERATION 204 to EVERY RECOVERY POINT BEING COPIED CHECK OPERATION 206. As set forth above, backup copy policy 158 specifies that only a weekly recovery point is copied.

Accordingly, flow moves to MOST RECENT ANCESTOR FULL BACKUP COPIED CHECK OPERATION 220. As set forth above, synthetic full backup SFB1 was created by combining full backup FB1 with incremental backups IB1-IB6. Accordingly, full backup FB1, i.e., the most recent ancestor fully backup, has been copied to secondary storage device 156 and flow moves to ALL ANCESTOR INCREMENTAL BACKUPS COPIED CHECK OPERATION 226.

Incremental backups IB1-IB6, i.e., some of the ancestor incremental backups, have been copied to secondary storage device 156 as part of synthetic full backup SFB1. Further, incremental backup IB7 has been copied to secondary storage device 156. However, incremental backups IB8, IB9, IB10, IB11, IB12, i.e., ancestor incremental backups for incremental backup IB13, have not been copied to secondary storage device 156. Accordingly, flow moves to GENERATE CONSOLIDATED INCREMENTAL BACKUP OPERATION 228.

In GENERATE CONSOLIDATED INCREMENTAL BACKUP OPERATION 228, a consolidated incremental backup CIB1 is generated on server system 130 as illustrated in FIG. 9. More particularly, incremental backups IB8-IB13 are combined to create consolidated incremental backup CIB1.

After consolidated incremental backup CIB1 is generated on server system 130, flow moves to COPY CONSOLIDATED INCREMENTAL BACKUP OPERATION 230. Consolidated incremental backup CIB1 is copied from server system 130 to secondary storage device 156 as illustrated in FIG. 9.

Referring again to FIG. 1, intelligent recovery point copy application 106 is in computer memory 136. As used herein, a computer memory refers to a volatile memory, a non-volatile memory, or a combination of the two.

Although intelligent recovery point copy application 106 is referred to as an application, this is illustrative only. Intelligent recovery point copy application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments have been described for a client-server configuration, an embodiment may be carried out using any suitable hardware configuration or means involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a tangible storage medium configured to store or transport computer readable code in accordance with an embodiment. Some examples of computer program products are CD-ROM discs, DVDs, ROM cards, floppy discs, magnetic tapes, computer hard drives, and servers on a network.

As illustrated in FIG. 1, this medium may belong to the computer system itself. However, the medium also may be removed from the computer system. For example, intelligent recovery point copy application 106 may be stored in memory 114 that is physically located in a location different from processor 134. Processor 134 should be coupled to the memory 114. This could be accomplished in a client-server system, or alternatively via a connection to another computer via modems and analog lines, or digital interfaces and a digital carrier line.

More specifically, in one embodiment, client computer system 102 and/or server system 130 is a portable computer, a workstation, a two-way pager, a cellular telephone, a digital wireless telephone, a personal digital assistant, a server computer, an Internet appliance, or any other device that includes components that can execute the intelligent recovery point copy functionality in accordance with at least one of the embodiments as described herein. Similarly, in another embodiment, client computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the intelligent recovery point copy functionality in accordance with one embodiment can be implemented in a wide variety of computer system configurations. In addition, the intelligent recovery point copy functionality could be stored as different modules in memories of different devices.

For example, intelligent recovery point copy application 106 could initially be stored in client computer system 102, and then as necessary, a portion of intelligent recovery point copy application 106 could be transferred to server system 130 and executed on server system 130. Consequently, part of the intelligent recovery point copy functionality would be executed on processor 134 of server system 130, and another part would be executed on processor 108 of client computer system 102. In view of this disclosure, those of skill in the art can implement various embodiments in a wide-variety of physical hardware configurations using an operating system and computer programming language of interest to the user.

In yet another embodiment, intelligent recovery point copy application 106 is stored in memory 114 of client computer system 102. Intelligent recovery point copy application 106 is transferred over network 124 to memory 136 in server system 130. In this embodiment, network interface 138 and I/O interface 110 would include analog modems, digital modems, or a network interface card. If modems are used, network 124 includes a communications network, and intelligent recovery point copy application 106 is downloaded via the communications network.

This disclosure provides exemplary embodiments. The scope is not limited by these exemplary embodiments. Numerous variations, whether explicitly provided for by the specification or implied by the specification or not, may be implemented by one of skill in the art in view of this disclosure.

What is claimed is:

1. A computer-implemented method comprising:
   determining that a recovery point is being copied from a primary storage device to a secondary storage device, said recovery point comprising at least a full backup of managed data;
   determining whether a backup copy policy specifies that every recovery point in said primary storage device is to be copied to said secondary storage, wherein upon a determination that said backup copy policy specifies that every recovery point in said primary storage device is to be copied to said secondary storage, said method further comprising:
   determining whether an incremental backup is being copied, wherein upon a determination that an incremental backup is not being copied, said method further comprising:
   copying said full backup from said primary storage device to said secondary device.

2. The computer-implemented method of claim 1 wherein said recovery point on said primary storage device consists of said full backup.

3. The computer-implemented method of claim 1 wherein upon a determination that an incremental backup is being copied, said method further comprising:
   determining whether an ancestor full backup and all ancestor incremental backups have been copied to said secondary storage device, wherein upon a determination that said ancestor full backup and said all ancestor incremental backups have been copied to said secondary storage device, said method further comprising:
   copying said incremental backup.

4. The computer-implemented method of claim 3 wherein upon a determination that said ancestor full backup and said all ancestor incremental backups have not been copied to said secondary storage device, said method further comprising:
   copying said ancestor full backup to said secondary storage device if said ancestor full backup has not been copied;
   copying missing ancestor incremental backups of said all ancestor incremental backups to said secondary storage device; and
   copying said incremental backup.

5. The computer-implemented method of claim 1 wherein upon a determination that said backup copy policy does not specify that every recovery point in said primary storage device is to be copied to said secondary storage, said method further comprising:
   determining whether a most recent ancestor full backup has been copied from said primary storage device to said secondary storage device, wherein upon a determination that said most recent ancestor full backup has not been copied from said primary storage device to said secondary storage device, said method further comprising:
   generating a synthetic full backup including said most recent ancestor full backup on said primary storage device.

6. The computer-implemented method of claim 5 further comprising copying said synthetic full backup from said primary storage device to said secondary storage device.

7. The computer-implemented method of claim 5 wherein upon a determination that said most recent ancestor full backup has been copied from said primary storage device to said secondary storage device, said method further comprising:
   determining whether all ancestor incremental backups have been copied from said primary storage device to said secondary storage device.

8. The computer-implemented method of claim 7 wherein upon a determination that said all ancestor incremental backups have been copied from said primary storage device to said secondary storage device, said method further comprising:
   copying an incremental backup from said primary storage device to said secondary storage device.

9. The computer-implemented method of claim 7 wherein upon a determination that said all ancestor incremental backups have not been copied from said primary storage device to said secondary storage device, said method further comprising:
   generating a consolidated incremental backup on said primary storage device, said consolidated incremental backup including missing ancestor incremental backups of said all incremental backups.

10. The computer-implemented method of claim 9 further comprising:
    copying said consolidated incremental backup from said primary storage device to said secondary storage device.

11. The computer-implemented method of claim 1 wherein said secondary storage device is directly connected to said primary storage device.

12. The computer-implemented method of claim 1 wherein said secondary storage device is connected to said primary storage device through a network.

13. The computer-implemented method of claim 1 wherein said full backup is a copy of all of said managed data.

14. The computer-implemented method of claim 1 wherein said recovery point further comprises an incremental backup, wherein said incremental backup is a copy of said managed data that has changed since said full backup was taken.

15. The computer-implemented method of claim 1 wherein said recovery point is a state of said managed data at a particular point in time.

16. The computer-implemented method of claim 1 wherein said backup copy policy defines recovery points to be copied to said primary storage device from a client computer system, said backup copy policy further defining a backup data format of said recovery points in said primary storage device.

17. The computer-implemented method of claim 16 wherein said backup copy policy further defines which recovery points of said recovery points in said primary storage device are to be copied to said secondary storage device.

18. The computer-implemented method of claim 17 wherein said backup copy policy specifies that only some of said recovery points in said primary storage device are to be copied to said secondary storage device.

19. A computer system comprising:
    a memory comprising an intelligent recovery point copy application;
    a processor coupled to said memory, wherein execution of said intelligent recovery point copy application by said processor results in a method comprising:
    determining that a recovery point is being copied from a primary storage device to a secondary storage device, said recovery point comprising at least a full backup of managed data;
    determining whether a backup copy policy specifies that every recovery point in said primary storage device is to be copied to said secondary storage, wherein upon a determination that said backup copy policy specifies that every recovery point in said primary storage device is to be copied to said secondary storage, said method further comprising:

determining whether an incremental backup is being copied, wherein upon a determination that an incremental backup is not being copied, said method further comprising:

copying said full backup from said primary storage device to said secondary device.

20. A computer-program product comprising a tangible computer readable storage medium containing computer program code comprising:

an intelligent recovery point copy application for determining that a recovery point is being copied from a primary storage device to a secondary storage device, said recovery point comprising at least a full backup of managed data;

said intelligent recovery point copy application further for determining whether a backup copy policy specifies that every recovery point in said primary storage device is to be copied to said secondary storage, wherein upon a determination that said backup copy policy specifies that every recovery point in said primary storage device is to be copied to said secondary storage, said intelligent recovery point copy application further for:

determining whether an incremental backup is being copied, wherein upon a determination that an incremental backup is not being copied, said intelligent recovery point copy application further for:

copying said full backup from said primary storage device to said secondary device.

* * * * *